(12) United States Patent
Thomas et al.

(10) Patent No.: US 10,977,660 B2
(45) Date of Patent: Apr. 13, 2021

(54) SYSTEM AND METHOD FOR AUTOMATICALLY PROCESSING ONLINE REFUND REQUEST

(71) Applicant: Walmart Apollo, LLC, Bentonville, AR (US)

(72) Inventors: Alyssa Rae Thomas, Daily City, CA (US); Ridhima Kaur Arora, South San Francisco, CA (US); Vidyanand Krishnan, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 212 days.

(21) Appl. No.: 16/263,987

(22) Filed: Jan. 31, 2019

(65) Prior Publication Data

US 2020/0250671 A1    Aug. 6, 2020

(51) Int. Cl.
*G06Q 20/40*     (2012.01)
*G06N 20/00*     (2019.01)

(52) U.S. Cl.
CPC ........... *G06Q 20/407* (2013.01); *G06N 20/00* (2019.01); *G06Q 20/4014* (2013.01)

(58) Field of Classification Search
USPC ........................................................ 705/75
See application file for complete search history.

(56) References Cited

U.S. PATENT DOCUMENTS 7,716,091 B2   5/2010  Ross
7,797,164 B2   9/2010  Junger et al.
(Continued)

*Primary Examiner* — Firmin Backer
(74) *Attorney, Agent, or Firm* — Bryan Cave Leighton Paisner LLP

(57) ABSTRACT

A system can include one or more processors and non-transitory computer-readable media storing computing instructions configured to run on the one or more processors and perform a method for automatically processing an online return request. The method performed by the system can receive a refund request from a user computer used by a customer of a grocery store, the refund request for returning a grocery item (a) previously purchased as part of a transaction of the grocery store and (b) paid for by a payment method via the transaction; and process a refund solution based on the transaction and the grocery item. In this system, the method can process the refund solution by determining a returnable status of the grocery item according to one or more returnability rules dynamically generated by a machine learning model. If the returnable status of the grocery item is negative, the method performed by this system can deny the return request. If the returnable status of the grocery item is not negative, the method performed by this system can then proceed with generating a cost-benefit analysis result based on one or more cost-benefit factors associated with the grocery item. If the cost-benefit analysis result is negative, the method performed by this system can process the refund request by returning a return amount to the customer for the grocery item; otherwise, the method can provide to the user computer an authorization for return of the grocery item to a physical location of the grocery store in order for the customer to receive the return amount for the refund request. Other embodiments are disclosed.

20 Claims, 4 Drawing Sheets

(56) References Cited

U.S. PATENT DOCUMENTS

| | | | |
|---|---|---|---|
| 8,065,233 B2* | 11/2011 | Lee | G06Q 20/04 |
| | | | 705/44 |
| 8,104,682 B2 | 1/2012 | Junger | |
| 10,027,802 B2* | 7/2018 | Ma | G06Q 30/0601 |
| 2003/0055727 A1 | 3/2003 | Walker et al. | |
| 2004/0044586 A1 | 3/2004 | Gullo et al. | |
| 2006/0106743 A1* | 5/2006 | Horvitz | G08G 1/0104 |
| | | | 706/21 |
| 2006/0149577 A1 | 7/2006 | Stashluk, Jr. et al. | |
| 2007/0156611 A1 | 7/2007 | Gupta et al. | |
| 2007/0260688 A1 | 11/2007 | Robinson et al. | |
| 2008/0046334 A1* | 2/2008 | Lee | G06Q 20/4016 |
| | | | 705/318 |
| 2016/0212267 A1* | 7/2016 | Ma | G06Q 30/0601 |
| 2016/0350756 A1 | 12/2016 | Shepard et al. | |
| 2017/0251106 A1* | 8/2017 | Ma | H04M 3/51 |
| 2018/0308047 A1 | 10/2018 | Wardell et al. | |

* cited by examiner

SYSTEM AND METHOD FOR AUTOMATICALLY PROCESSING ONLINE REFUND REQUEST

TECHNICAL FIELD

This disclosure relates generally to automatically processing a refund request from a user computer of a customer, the refund request being associated with a grocery item previously purchased as part of a transaction of a grocery store.

BACKGROUND

Consumers who order online generally prefer to return defected, damaged, or unwanted product online without contacting customer service. Some consumers give up on returning a product because the value of the returned product is not worth the time and effort to return it by talking to customer service, waiting in line for in-store return, or shipping the product back. For example, grocery items are generally inexpensive, and not many consumers would like to make a trip back to a store and wait in line simply to return a bag of candy that is worth less than $3. However, the store that sold the product is not benefited from this because the consumers would blame the store for their loss and switch away to other stores. Therefore, systems and methods for automatically processing a refund request, refunding online without the requirement to return for certain products, and improving the process for in-store return, are desired.

BRIEF DESCRIPTION OF THE DRAWINGS

To facilitate further description of the embodiments, the following drawings are provided in which.

Figure 1:
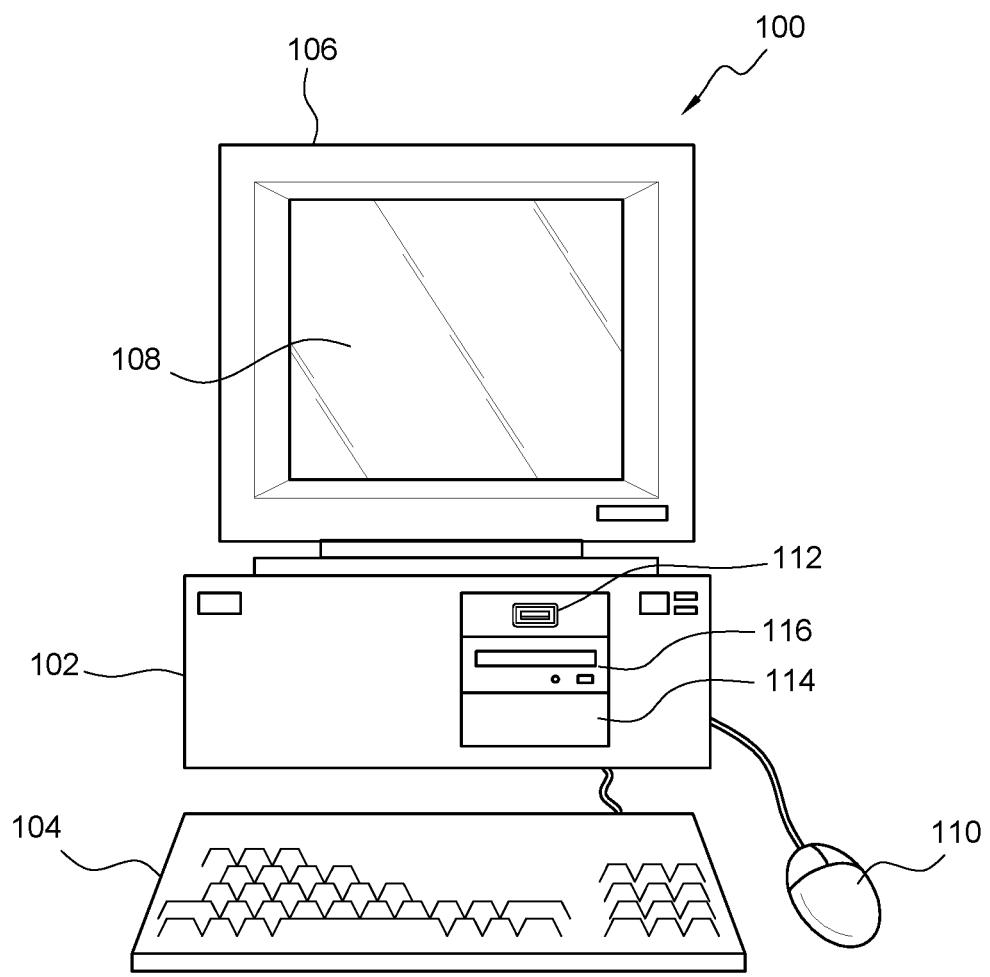
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
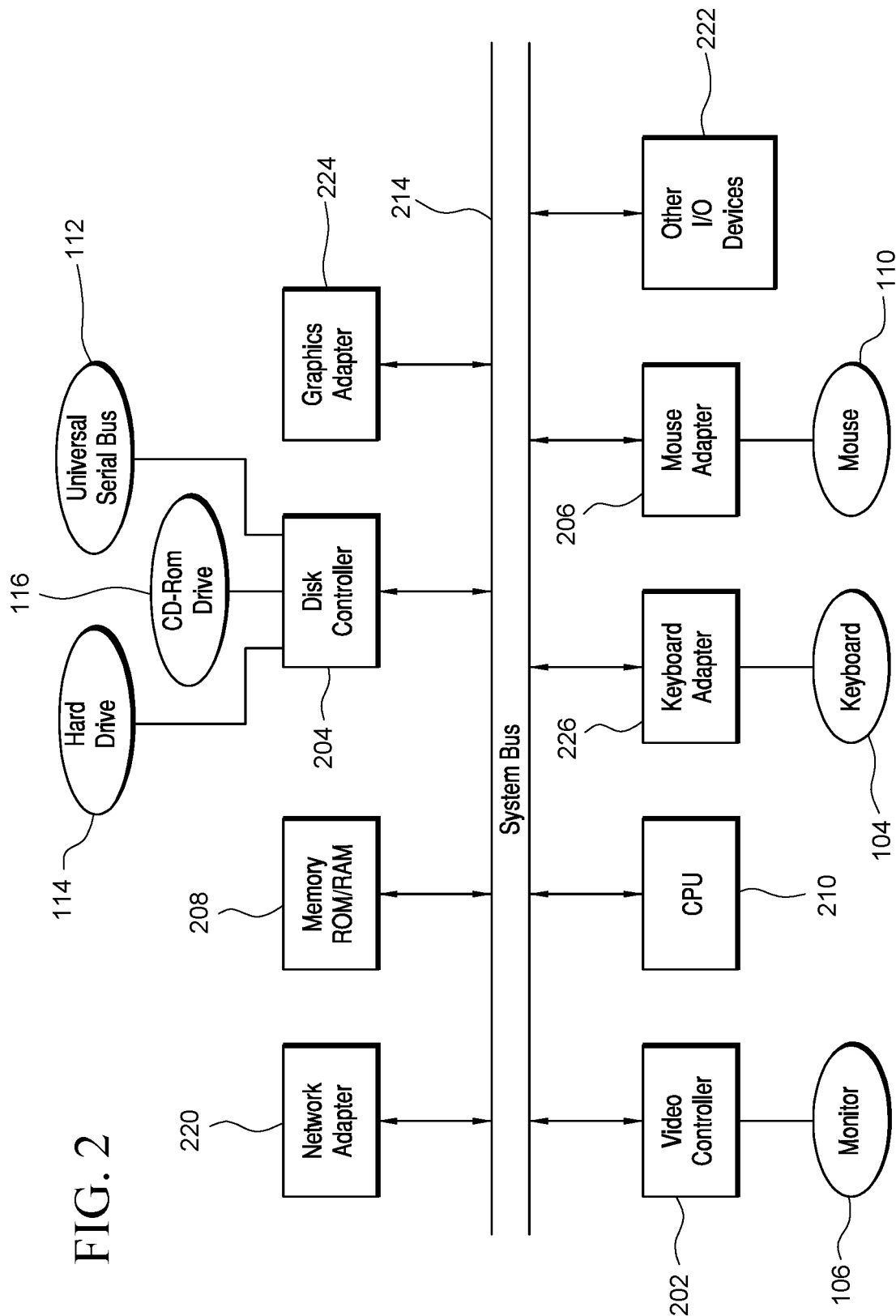
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. In the same or different embodiments, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
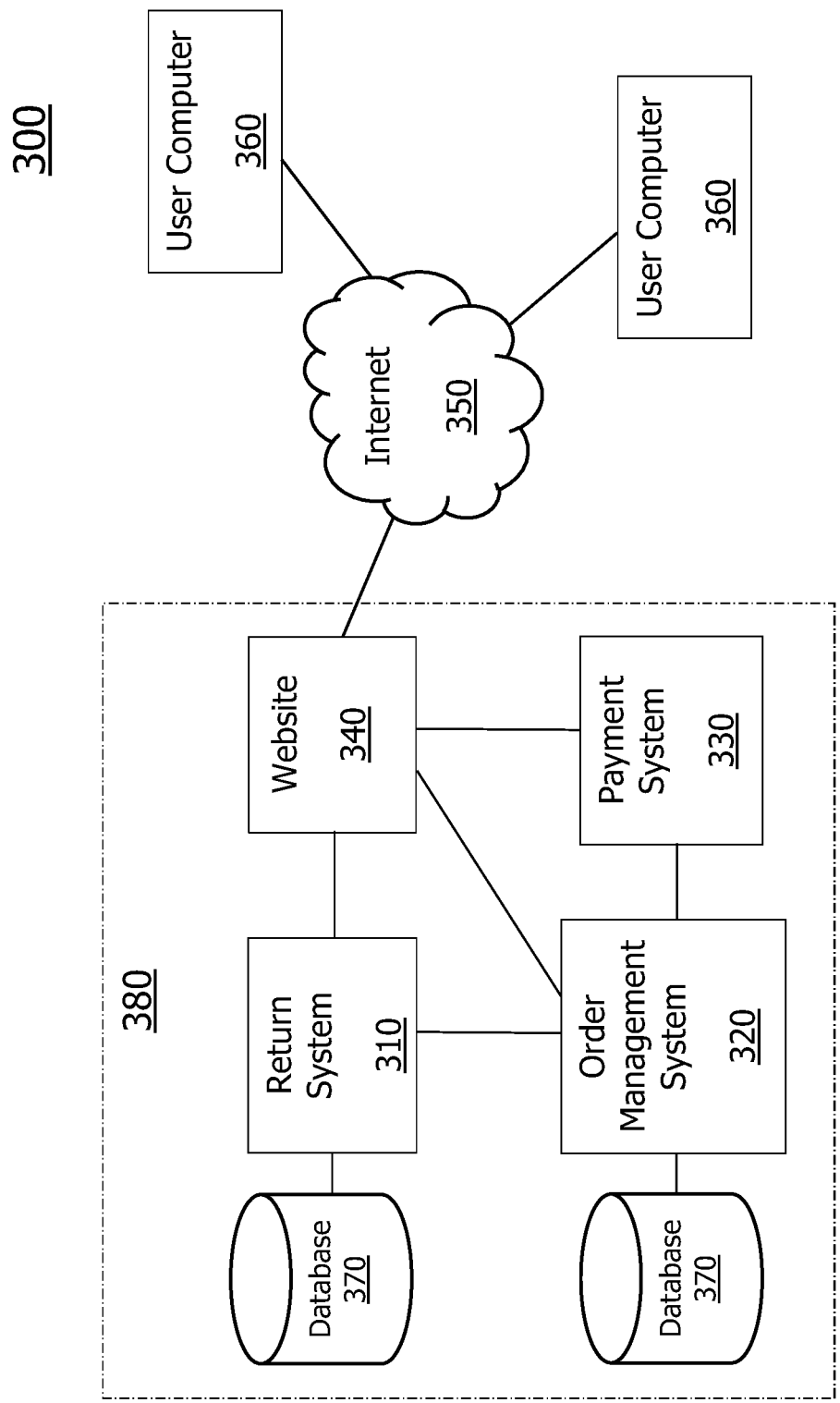
FIG. 3 illustrates a system for automatically processing online return requests from customers, according to an embodiment.

Turning ahead in the drawings, FIG. 3 illustrates system 300, according to an embodiment. In many embodiments, system 300 can be configured to automatically process an online refund request for returning a grocery item. System 300 is merely exemplary, and embodiments of system 300 are not limited to the embodiments presented herein. System 300 can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. Systems 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

As shown in the embodiment in FIG. 3, system 300 comprises a return system, such as return system 310, an order management system, such as order management system 320, a payment system, such as payment system 330, a website, such as website 340, a computer network, such as Internet 350, one or more user computers, such as user computers 360, and one or more databases, such as databases 370. In many embodiments, return system 310 can be configured to automatically process a refund request from user computers 360. In this embodiment, Internet 350 is coupled to website 340 and one or more user computers 360; and computer databases 370 are coupled to return system 310 and order management system 320, respectively. Also in this embodiment, website 340 can be coupled to return system 310, order management system 320, and payment system 330, and vice versa, and order management system 320 can be coupled to return system 310, payment system 330, and website 340, and vice versa. In a different embodiment, one or more of return system 310, order management system 320, or payment 330 can be combined together into an single, integrated system.

In some embodiments, system 380 can comprise return system 310, order management system 320, payment system 330, website 340, and one or more computer databases 370 and be in data communication through Internet 350 with one or more user computers 360. In some embodiments, return system 310, order management system 320, payment system 330, and website 340 can communicate with each other through an internal network, in system 380, separate from a computer network coupling user devices 360 to system 380. In some embodiments, return system 310, order management system 320, and/or payment system 330 can be in data communication with user computers 360 through a website, such as website 340, hosted by a web server that hosts one or more other websites. In some embodiments, system 300, return system 310, order management system 320, payment system 330, and/or system 380 can be in data communication with another system, such as an in-store return system configured to process a refund request for a grocery item brought by a customer to a physical location of a grocery store for return, a customer service system configured to process a refund request of a grocery item over a phone, a text message, an email, or a facsimile, and/or a machine learning model configured to provide and dynamically improve one or more security mechanisms to protect the embodiment from fraud or cyberattack.

In some embodiments, user computers 360 can be used by users, which also can be referred to as customers. In these or other embodiments, an operator and/or administrator of system 300 can manage return system 310, order management system 320, payment system 330, website 340, and/or user computers 360, and/or the memory storage unit(s) of return system 310, order management system 320, payment system 330, website 340, and/or user computers 360 using the input device(s) and/or display device(s) of return system 310, order management system 320, payment system 330, website 340, and/or user computers 360.

In many embodiments, return system 310 also can include one or more of order management system 320, payment system 330, website 340, and/or one or more databases 370. System 310, order management system 320, payment system 330, website 340, and/or system 380 can each be a computer system, such as computer system 100 (FIG. 1), as described above, and can each be a single computer, a single server, or a cluster or collection of computers or servers, or a cloud of computers or servers. In other embodiments, a single computer system can host return some or all of system 300, system 310, order management system 320, payment system 330, website 340, and system 380.

In certain embodiments, user computers 360 can be implemented with desktop computers, laptop computers, a mobile device, and/or other endpoint devices used by one or more users, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300, return system 310, order management system 320, payment system 330, website 340, and system 380 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300, return system 310, order management system 320, payment system 330, website 340, and/or system 380 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300, return system 310, order management system 320, payment system 330, website 340, and/or system 380. In a similar manner, the processors and/or the non-transitory computer-readable media can be local and/or remote to each other.

Meanwhile, in many embodiments, system 300, return system 310, order management system 320, payment system 330, website 340, and/or system 380 each also can be configured to communicate with and/or include one or more databases, such as databases 370, and/or other suitable databases. The one or more databases can include an order database that contains data associated with one or more transactions of a grocery store and including information about one or more grocery items purchased as part of each transaction and a payment method used for each transaction, for example, among other data as described herein, such as described herein in further detail. The one or more databases also can include a user database that contains data about one or more user accounts of consumers, including a purchase history, a return history, a payment history, one or more payment methods, and/or one or more user computers associated with each of the one or more user accounts, for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, return system 310, order management system 320, payment system 330, website 340, system 380, and/or the one or more databases 370 can be implemented using any suitable manner of wired and/or wireless communication. Accordingly, system 300, return system 310, order management system 320, payment system 330, website 340, and/or system 380 can each include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
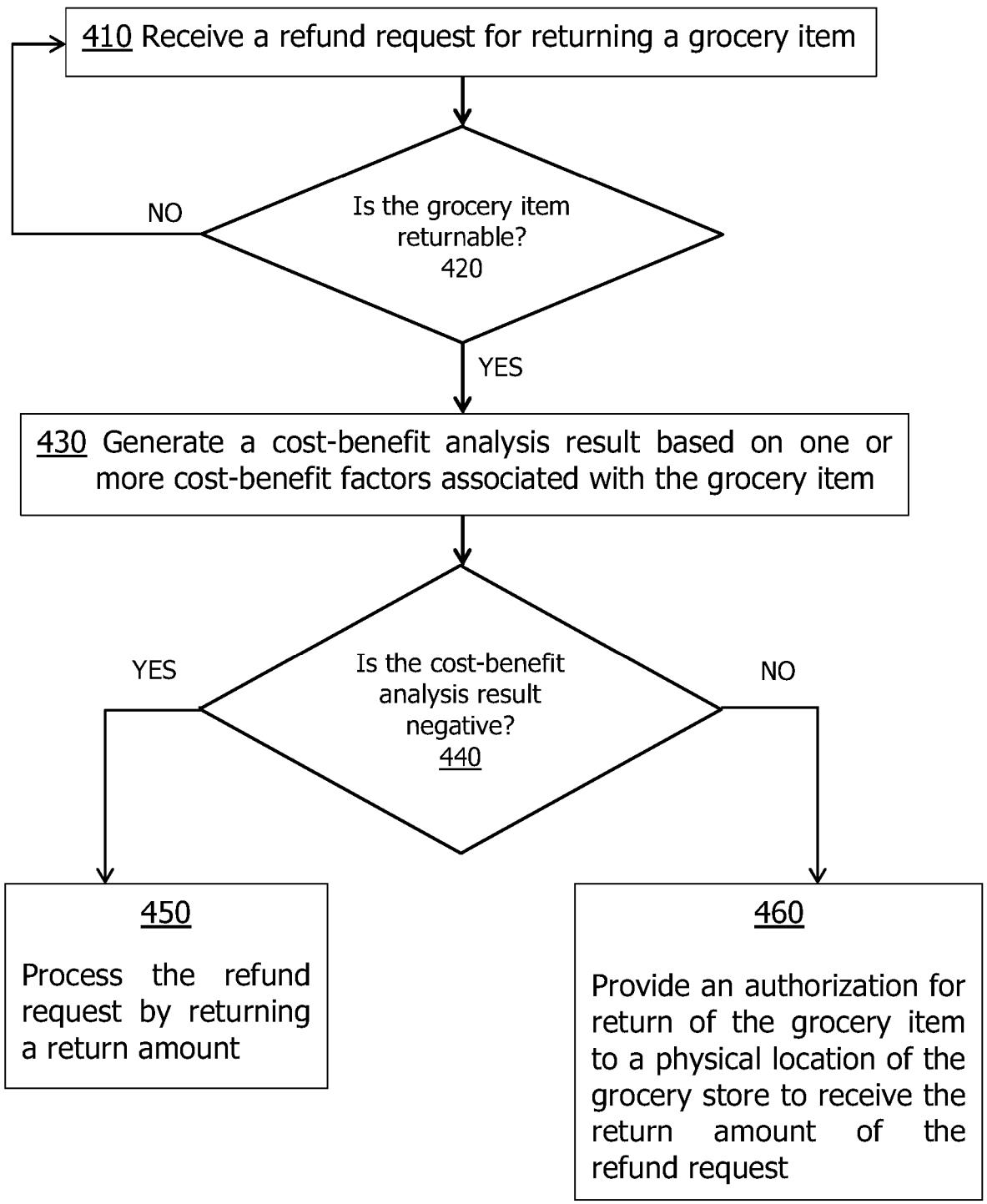
FIG. 4 illustrates a flow chart for a method for automatically processing online return, according to another embodiment.

Turning ahead in the drawings, FIG. 4 illustrates a flow chart for a method 400, according to an embodiment. In many embodiments, method 400 can be implemented via execution of computing instructions configured to run at one or more processors and stored at one or more non-transitory computer-readable media for automatically processing a refund request for returning a grocery item. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), return system 310 (FIG. 3), and/or system 380 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3), return system 310 (FIG. 3), and/or system 380 (FIG. 3). The processor(s) can be similar or identical to the processor(s) described above with respect to computer system 100 (FIG. 1).

In many embodiments, method 400 can be performed by a computer server, such as system 300 (FIG. 3), return system 310 (FIG. 3), and/or system 380 (FIG. 3), to receive a refund request from a user computer, such as user computers 360 (FIG. 3), used by a customer of a grocery store, for returning a grocery item (block 410), the grocery item being previously purchased as part of a transaction of the grocery store and paid for by a payment method via the transaction. In many embodiments, method 400 can comprise (a) retrieving, by an order management system such as order management system 320 (FIG. 3), one or more transactions of the grocery store by the customer, (b) providing a user interface configure to be rendered on the user computer, such as user computer 360 (FIG. 3), and (c) allowing the customer to choose from one or more previously purchased items from one of the one or more transactions for the refund request. An example of such user interface is a webpage on a website, such as website 340 (FIG. 3), or a GUI of an app installed on the user computer, such as user computer 360 (FIG. 3). In some embodiments, the user interface for receiving the refund request also can comprise an input control, such as a text box and/or a list of predetermined options, configured to receive a reason for return from the user computer; and method 400 can forward the reason for return to the grocery store and/or save the reason for return at a database, such as database 370 (FIG. 3), for future analysis, such as the analysis of an abuser status of the customer, or the analysis of the overall quality of the grocery item or the supplier.

In some embodiments, the transaction to be displayed at the user interface can be an online transaction of the grocery store. In some embodiments, the transaction also can be a transaction at a physical location of the grocery store, when the transaction can be linked to a single online user account of the customer, by using payment methods, such as credit cards and debit cards, associated with the user account, and/or scanning a membership card with a customer ID number at checkout, etc. In some embodiments, the transaction can be a transaction of a different grocery store associated with the grocery store for returning the grocery item, when the store policy of the grocery store allows such refund or return requests.

In many embodiments, method 400 can be performed by a computer server, such as system 300 (FIG. 3), return system 310 (FIG. 3), and/or system 380 (FIG. 3), to determine whether the grocery item is returnable (block 420). In many embodiments, method 400 can determine whether the grocery item is returnable according to one or more returnability rules dynamically generated by a machine learning model based on an abuser status of the user account; a suspicious device status associated with the user computer;

and/or at least one of one or more laws or regulations, the one or more laws or regulations being associated with the grocery item and a physical location of the grocery store. In some embodiments, the user account can be flagged with a positive abuser status when the return history of the user account shows irregular return activities, including: too many returns in a period of time, such as 10 returns every month or 50 returns for the past 6 months; too high a return rate compared to a predetermined threshold, such as 50% or 80%; and/or a suspicious pattern of the refund requests, such as many grocery items returned after being almost completely consumed or repeated purchases and returns of the same grocery items, etc. In some embodiments, method 400 also can determine that the abuser status of the user account is positive when the payment history of the user account includes one or more payment methods that were denied at least once by a financial institution, etc. In many embodiments, when the abuser status of the user account is positive, method 400 can be configured to update the abuser status of the user account in a database, such as database 370 (FIG. 3); determine that the grocery item is not returnable; and set a returnable status of the grocery item as negative.

In some embodiments, based on the one or more returnability rules, method 400 can be performed by a computer server, such as system 300 (FIG. 3), return system 310 (FIG. 3), and/or system 380 (FIG. 3), to determine that the grocery item is not returnable after finding that the user computer is a suspicious device. In many embodiments, method 400 can be performed by a computer server, such as system 300 (FIG. 3), return system 310 (FIG. 3), website 340 (FIG. 3), and/or system 380 (FIG. 3), to identify the user computer by an IP (Internet Protocol) address of the user computer or an Internet cookie with identifying information provided by the user computer. In many embodiments, indications of a positive suspicious device status of a computer device can include one or more of: when one or more other user accounts with positive abuser statuses are associated with this computer device, when the IP address of the user computer is included in a preexisting IP address list of possible scammers, abusers, or hackers, and so forth. In many embodiments, when the suspicious device status of the user computer is positive, method 400 can be configured to update the suspicious device status of the user computer in a database, such as database 370 (FIG. 3); determine that the grocery item is not returnable; and set a returnable status of the grocery item as negative.

In many embodiments, method 400 can be performed by a computer server, such as system 300 (FIG. 3), return system 310 (FIG. 3), and/or system 380 (FIG. 3), to determine that the grocery item is not returnable because the one or more returnability rules comprise one or more laws or regulations that prohibit return of the grocery item. In many embodiments, the one or more laws or regulations include laws or regulations specific to the physical location of the grocery store, such as the federal laws or rules of a federal agency of the United States, and/or laws or regulations of a state or a city where the grocery store is located. In many embodiments, the one or more returnability rules can further comprise: the returnability status of a grocery item can be positive only when a refund request for returning the grocery item is received by method 400 and/or return system 310 (FIG. 3) within a maximum time period from the date of the transaction including the grocery item, such as 3 days for perishable grocery items and 30 days for nonperishable grocery items; the returnability status of a grocery item can be positive only when the grocery item is sealed, unopened, or otherwise unused or unconsumed; and/or the returnability status of a grocery item can be positive only when the grocery item was not purchased at a final sale or on clearance, etc.

In many embodiments, the one or more returnability rules used in method 400 can be stored in a computer database, such as database 370 (FIG. 3), and/or dynamically generated, at least partially, based on a machine learning model. In many embodiments, the machine learning model can be pre-trained, but also can consider both historical and dynamic input from this and other grocery stores, financial institutions, and/or anti-fraud organizations with current data to identify indications or clues of suspicious refund requests. In many embodiments, the machine learning model also can consider historical and dynamic input from one or more law libraries to update the one or more returnability rules regarding the returnability status of a grocery item according to one or more laws or regulations currently effective and applicable to the grocery store for returning the grocery item. In many embodiments, the machine learning module can be hosted by any suitable computer systems, such as one or more computer systems 100 (FIG. 1), system 300 (FIG. 3), return system 310 (FIG. 3), and/or system 380 (FIG. 8), and implemented by any one or more artificial intelligence (AI) models known in the art, such as deep learning networks, that are capable of dynamically learning information about suspicious user activities, suspicious user computers, and/or laws or regulations concerning one or more grocery items.

In many embodiments with a user interface configured for the consumer to select one or more purchased items in a transaction to return and submit the refund request, method 400 can be configured to disable any grocery item of the one or more of the purchased items from any selection in the user interface for the refund request when the returnability status of the any grocery item is negative. In some embodiments with another user interface, method 400 can display an activated return control, such as a button or a check box, associated with a grocery item of one or more purchased items in a transaction, the activated return control being configured to incorporate the grocery item to the refund request when triggered by the customer, only when the returnability status of the grocery item is positive. In some embodiments with another user interface, method 400 can be configured to not show any grocery item of one or more purchased items in a transaction in the user interface for the refund request when the returnability status of the any grocery item is negative. In some embodiments with yet another user interface, method 400 can be configured to show a warning message when any grocery item, of one or more of the purchased items in a transaction, with a negative returnability status is selected by the consumer.

In many embodiments, when the grocery item is not returnable, method 400 can be performed by a computer server, such as system 300 (FIG. 3), return system 310 (FIG. 3), website 340 (FIG. 3), and/or system 380 (FIG. 3), to provide the rejection decision to the user computer, such as user computer 360 (FIG. 3); and the rejection decision can comprise at least one of a rejection reason, such as "This item is not returnable because suspicious activity is detected." In some embodiments, method 400 also can provide an instruction for the customer to contact customer service to potentially resolve the denial of the return request, such as clarifying and resetting the abuser status of the customer's account, if possible. In some embodiments, method 400 can advise the customer to try to return the grocery item at a physical location of the grocery store in person. In some embodiment, method 400 can further send the rejection decision by email to the customer or an in-app message.

In many embodiments, when the grocery item is returnable, method 400 can be performed by a computer server, such as system 300 (FIG. 3), return system 310 (FIG. 3), and/or system 380 (FIG. 3), to generate a cost-benefit analysis result abased on one or more cost-benefit factors associated with the grocery item (block 430). Furthermore, in many embodiments, upon the confirmation of the returnability of the grocery item, method 400 also can update, by an order management system such as order management system 320 (FIG. 3), a record associated with the transaction in a database for orders, such as database 370 (FIG. 3), so that the returned grocery item cannot be returned again by the same customer and/or by any other customer.

In many embodiments, the one or more cost-benefit factors can comprise one or more of: a processing cost for a return of the grocery item; a resale profit of the grocery item; a return policy from a supplier of the grocery item, and/or a donatable status of the grocery item. For example, in an embodiment, method 400 can be configured to determine that the cost-benefit analysis result is positive because the resale profit of the grocery item outweighs the costs associated with receiving, refunding, storing, and re-shelving the returned grocery item as a whole. In another embodiment, method 400 can conduct the cost-benefit analysis by checking the return policy from the supplier of the grocery item, and if the supplier allows return of the grocery item and if a return amount from the supplier is more than the cost of returning the grocery item, then method 400 can determine that the cost-benefit analysis result is positive. In yet another embodiment, method 400 can be configured to set the cost-benefit analysis result to positive when the grocery item for return can be donated to a charity, a school, or people in need. In an embodiment, method 400 can determine that the cost-benefit analysis result of the grocery item is negative when: (a) the costs of receiving, refunding, storing, and re-shelving the returned grocery item outweighs the resale profit; (b) the supplier of the grocery item does not allow the return of the grocery item; (c) the cost for returning the item to the supplier is more than the return amount from the supplier; and/or (d) the grocery item is not donatable for various reasons, such as when local charities or schools currently have no need of such grocery item, or when the grocery item is likely past its expiration date.

In many embodiments, when the cost-benefit-analysis result is negative (block 440), method 400 can be performed by a computer server, such as system 300 (FIG. 3), return system 310 (FIG. 3), and/or system 380 (FIG. 3), to process the refund request by returning a return amount of the grocery item (block 450), by a payment system such as payment system 330 (FIG. 3), to the consumer. In many embodiments, the return amount of the grocery item can be the sale price plus the tax paid for the grocery item, deducting any discount or coupon applied to the grocery item in the transaction, any delivery fee attributed to the grocery item, and/or any handling and processing fee attributed to the return of the grocery item. In many embodiments, method 400 can refund the return amount, by a payment system such as payment system 330 (FIG. 3), to the original payment method used to purchase the grocery item, including a credit card, a debit card, an Electronic Benefit Transfer (EBT) card, a P2P (person-to-person or peer-to-peer) payment service account, or a check. In some embodiments, method 400 can be configured to refund by giving store credit to the user account.

In many embodiments, when the cost-benefit-analysis result is not negative (block 440), method 400 can be performed by a computer server, such as system 300 (FIG. 3), return system 310 (FIG. 3), and/or system 380 (FIG. 3), to process the refund request by providing an authorization for return of the grocery item to a physical location of the grocery store to receive the return amount of the refund request (block 460). In many embodiments, the authorization for return can comprise a bar code associated with the return amount for the grocery item determined based on one or more of a sale price of the grocery item, a discount of the grocery item, a tax of the grocery item, a delivery fee associated with the grocery item, and/or a handling and processing fee attributed to the return of the grocery item. In an embodiment, the grocery store can comprise a speedy return counter or a kiosk for consumers with authorizations for return from method 400 to skip the standard line for returns.

In an embodiment, a system can comprise one or more processors; and one or more non-transitory computer-readable media storing computing instructions configured to run on the one more processors. The computing instructions in this embodiment can be configured to automatically process an online return request by: receiving a refund request from a user computer used by a customer of a grocery store, the refund request for returning a grocery item (a) previously purchased as part of a transaction of the grocery store and (b) paid for by a payment method via the transaction; and processing a refund solution based on the transaction and the grocery item. In this embodiment, the computing instructions can be configured to process the refund solution by: determining a returnable status of the grocery item according to one or more returnability rules. The one or more returnability rules in this embodiment can be dynamically generated, entirely or partially, by a machine learning model, hosted by the embodiment or a computer system coupled to this embodiment.

If the returnable status of the grocery item is negative, the computing instructions can be configured to deny the return request. A grocery item can be non-returnable based on the one or more returnability rules when a law or regulation excludes any return of this kind of products, when the customer's account is flagged as an abuser of the system, and/or when the user computer has been associated with at least one abuser of the system even if this customer's account is not identified as an abuser. In this embodiment, the computing instructions also can be configured to provide one or more reasons for the rejection or instructions to the customer to contact customer service.

In this embodiment, if the returnable status of the grocery item is not negative, the computing instructions can then be configured to proceed with generating a cost-benefit analysis result based on one or more cost-benefit factors associated with the grocery item. The cost-benefit factors in this embodiment can include: a processing cost for a return of the grocery item, a resale profit of the grocery item, a return policy from a supplier of the grocery item, and/or a donatable status of the grocery item. If the cost-benefit analysis result is negative, the computing instructions in this embodiment can be configured to process the refund request by returning a return amount to the customer for the previously purchased grocery item. If the cost-benefit analysis result is not negative, the computing instructions in this embodiment can be configured to provide to the user computer an authorization for return of the grocery item to a physical location of the grocery store in order for the customer to receive the return amount for the refund request.

In another embodiment, a method can be implemented via execution of computing instructions configured to run at one or more processors and stored at one or more non-transitory computer-readable media. The method in this embodiment can comprise: receiving a refund request from a user computer used by a customer of a grocery store, the refund request for returning a grocery item (a) previously purchased as part of a transaction of the grocery store and (b) paid for by a payment method via the transaction; and processing a refund solution based on the transaction and the grocery item. In this embodiment, the method can process the refund solution by: determining a returnable status of the grocery item according to one or more returnability rules; and when the returnable status for the grocery item is negative, returning a rejection decision to the user computer. The one or more returnability rules can be similar to one or more of the aforementioned returnability rules and be dynamically generated by a machine learning model similar to the machine learning model in other embodiments.

When the returnable status for the grocery item is positive, the method can generate a cost-benefit analysis result based on one or more cost-benefit factors associated with the grocery item. The one or more cost-benefit factors can be similar to one or more of the aforementioned cost-benefit factors in other embodiments. When the cost-benefit analysis result is negative, the method in this embodiment can process the refund request by returning a return amount to the customer for the grocery item. When the cost-benefit analysis result is not negative, the method in this embodiment can provide, to the user computer, an authorization for return of the grocery item to a physical location of the grocery store in order for the customer to receive the return amount for the refund request.

In many embodiments, the techniques described herein can provide a practical application and several technological improvements. In some embodiments, the technique described herein can provide for automatic determination and processing of a refund request using specific input data and a machine learning model configured to dynamically generate and provide the one or more returnability rules regarding the grocery item to be returned. In some embodiments, the technique described herein can be configured to prevent fraud or cyberattack by hackers or scammers and improve the security of an online return system.

Although the systems and methods have been described herein with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 may be modified, and that the foregoing discussion of certain of these embodiments does not necessarily represent a complete description of all possible embodiments. In another example, one or more of the procedures, processes, or activities may include different procedures, processes, and/or activities and be performed in many different orders. As yet another example, the grocery store and grocery item can be replaced by a general retail store and a general retail item.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   receiving a refund request from a user computer used by a customer of a grocery store, the refund request for returning a grocery item (a) previously purchased as part of a transaction of the grocery store and (b) paid for by a payment method via the transaction; and
   processing a refund solution based on the transaction and the grocery item by:
      determining a returnable status of the grocery item according to one or more returnability rules dynamically generated by a machine learning model;
      when the returnable status for the grocery item is negative, returning a rejection decision to the user computer; and
      when the returnable status for the grocery item is positive:
         generating a cost-benefit analysis result based on one or more cost-benefit factors associated with the grocery item;
         when the cost-benefit analysis result is negative, processing the refund request by returning a return amount to the customer for the grocery item; and
         when the cost-benefit analysis result is not negative, providing, to the user computer, an authorization for a return of the grocery item to a physical location of the grocery store in order for the customer to receive the return amount for the refund request.

2. The system of claim 1, wherein the one or more returnability rules are based on at least one of one or more laws or regulations, the one or more laws or regulations being associated with the grocery item and the physical location of the grocery store.

3. The system of claim 1, wherein:
   the one or more returnability rules are dynamically generated by the machine learning model based on an abuser status of a user account in a database, the user account being associated with the transaction; and
   the determining the returnable status of the grocery item according to the one or more returnability rules comprises:
      when the abuser status of the user account is positive, determining that the returnable status of the grocery item is negative; and
      when the abuser status of the user account is negative:
         determining the abuser status based on at least one of:

a return history of the user account; or a payment history of the user account; and when determining the abuser status of the user account determines that the return history of the user account exceeds a predetermined return ratio or that the payment history of the user account is poor:

updating the abuser status of the user account in the database from negative to positive; and determining that the returnable status of the grocery item is negative.

4. The system of claim 3, wherein:

the one or more returnability rules are dynamically generated by the machine learning model based on a suspicious device status associated with the user computer in the database; and the determining the returnable status of the grocery item according to the one or more returnability rules comprises:

when the suspicious device status associated with the user computer is positive, determining that the returnable status of the grocery item is negative; and when the suspicious device status associated with the user computer is negative:

determining the suspicious device status based on the abuser status of the user account, a second abuser status of at least one second user account associated with the user computer, and an IP address of the user computer; and when the suspicious device status associated with the user computer is positive:

updating the suspicious device status associated with the user computer in the database from negative to positive; and determining that the returnable status of the grocery item is negative.

5. The system of claim 1, wherein the rejection decision comprises at least one of a rejection reason or an instruction to contact customer service.

6. The system of claim 1, wherein the computing instructions are further configured to run on the one or more processors and perform:

providing a user interface to be rendered on the user computer, the user interface being configured to display one or more purchased items associated with the transaction, wherein the one or more purchased items comprise the grocery item;

determining the returnable status of each item of the one or more purchased items according to the one or more returnability rules; and when the returnable status of the each item is positive, the user interface is configured to display an activated return control configured to incorporate the each item to the refund request when triggered by the customer.

7. The system of claim 1, wherein the computing instructions are further configured to run on the one or more processors and perform:

providing a user interface to be rendered on the user computer, the user interface being configured to submit a reason for the refund request from the user computer; and forwarding the reason for the refund request to the grocery store.

8. The system of claim 1, wherein the one or more cost-benefit factors associated with the grocery item comprise at least one of a processing cost for the return of the grocery item, a resale profit of the grocery item, a return policy from a supplier of the grocery item, or a donatable status of the grocery item.

9. The system of claim 1, wherein:

the payment method associated with the transaction is one of a credit card, a debit card, a gift card, or an electronic benefit transfer card; and after the grocery item is returned to the physical location of the grocery store, the return amount is refunded to the customer via a form of the payment method used to purchase the grocery item.

10. The system of claim 1, wherein the authorization for the return of the grocery item comprises a bar code associated with the return amount for the grocery item determined based on one or more of a sale price of the grocery item, a discount of the grocery item, a tax of the grocery item, or a delivery fee associated with the grocery item.

11. A method being implemented via execution of computing instructions configured to run at one or more processors and stored at one or more non-transitory computer-readable media, the method comprising:

receiving a refund request from a user computer used by a customer of a grocery store, the refund request for returning a grocery item (a) previously purchased as part of a transaction of the grocery store and (b) paid for by a payment method via the transaction; and processing a refund solution based on the transaction and the grocery item by:

determining a returnable status of the grocery item according to one or more returnability rules dynamically generated by a machine learning model;

when the returnable status for the grocery item is negative, returning a rejection decision to the user computer; and when the returnable status for the grocery item is positive:

generating a cost-benefit analysis result based on one or more cost-benefit factors associated with the grocery item;

when the cost-benefit analysis result is negative, processing the refund request by returning a return amount to the customer for the grocery item; and when the cost-benefit analysis result is not negative, providing, to the user computer, an authorization for a return of the grocery item to a physical location of the grocery store in order for the customer to receive the return amount for the refund request.

12. The method of claim 11, wherein the one or more returnability rules are dynamically generated by the machine learning model based on at least one of one or more laws or regulations, the one or more laws or regulations being associated with the grocery item and the physical location of the grocery store.

13. The method of claim 11, wherein:

the one or more returnability rules are dynamically generated by the machine learning model based on an abuser status of a user account in a database, the user account being associated with the transaction; and the determining the returnable status of the grocery item according to the one or more returnability rules comprises:

when the abuser status of the user account is positive, determining that the returnable status of the grocery item is negative; and when the abuser status of the user account is negative:

determining the abuser status based on at least one of:
- a return history of the user account; or
- a payment history of the user account; and when determining the abuser status of the user account determines that the return history of the user account exceeds a predetermined return ratio or that the payment history of the user account is poor:
- updating the abuser status of the user account in the database from negative to positive; and
- determining that the returnable status of the grocery item is negative.

14. The method of claim 13, wherein:

the one or more returnability rules are dynamically generated by the machine learning model based on a suspicious device status associated with the user computer in the database; and the determining the returnable status of the grocery item according to the one or more returnability rules comprises:
- when the suspicious device status associated with the user computer is positive, determining that the returnable status of the grocery item is negative; and
- when the suspicious device status associated with the user computer is negative:
  - determining the suspicious device status based on the abuser status of the user account, a second abuser status of at least one second user account associated with the user computer, and an IP address of the user computer; and
  - when the suspicious device status associated with the user computer is positive:
    - updating the suspicious device status associated with the user computer in the database from negative to positive; and
    - determining that the returnable status of the grocery item is negative.

15. The method of claim 11, wherein the rejection decision comprises at least one of a rejection reason or an instruction to contact customer service.

16. The method of claim 11 further comprising:
- providing a user interface to be rendered on the user computer, the user interface being configured to display one or more purchased items associated with the transaction, wherein the one or more purchased items comprise the grocery item;
- determining the returnable status of each item of the one or more purchased items according to the one or more returnability rules; and
- when the returnable status of the each item is positive, the user interface is configured to display an activated return control configured to incorporate the each item to the refund request when triggered by the customer.

17. The method of claim 11 further comprising:
- providing a user interface to be rendered on the user computer, the user interface being configured to submit a reason for the refund request from the user computer; and
- forwarding the reason for the refund request to the grocery store.

18. The method of claim 11, wherein the one or more cost-benefit factors associated with the grocery item comprise at least one of a processing cost for the return of the grocery item, a resale profit of the grocery item, a return policy from a supplier of the grocery item, or a donatable status of the grocery item.

19. The method of claim 11, wherein:
- the payment method associated with the transaction is one of a credit card, a debit card, a gift card, or an electronic benefit transfer card; and
- after the grocery item is returned to the physical location of the grocery store, the return amount is refunded to the customer via a form of the payment method used to purchase the grocery item.

20. The method of claim 11, wherein the authorization for the return of the grocery item comprises a bar code associated with the return amount for the grocery item determined based on one or more of a sale price of the grocery item, a discount of the grocery item, a tax of the grocery item, or a delivery fee associated with the grocery item.

* * * * *